United States Patent
Prouzet et al.

(10) Patent No.: US 7,528,178 B2
(45) Date of Patent: May 5, 2009

(54) METHOD FOR PREPARING BEADS CONTAINING A CROSSLINK MINERAL/INORGANIC MATRIX

(75) Inventors: Eric Prouzet, Montpellier (FR); Miriam Tokumoto, Lins-SP (BR); Aurore Krivaya, St Chinian (FR)

(73) Assignee: Centre National de la Recherche Scientifique, Paris (FR)

( * ) Notice: Subject to any disclaimer, the term of this patent is extended or adjusted under 35 U.S.C. 154(b) by 191 days.

(21) Appl. No.: 10/521,194

(22) PCT Filed: Jul. 18, 2003

(86) PCT No.: PCT/FR03/02285

§ 371 (c)(1),
(2), (4) Date: Aug. 16, 2005

(87) PCT Pub. No.: WO2004/009229

PCT Pub. Date: Jan. 29, 2004

(65) Prior Publication Data

US 2006/0134152 A1   Jun. 22, 2006

(30) Foreign Application Priority Data

Jul. 22, 2002   (FR)   .................................. 02/09286

(51) Int. Cl.
*B32B 5/16*   (2006.01)
*B01J 13/00*   (2006.01)
*B01J 13/22*   (2006.01)

(52) U.S. Cl. ......................... 516/99; 428/403; 428/404; 516/107

(58) Field of Classification Search ................. 428/403, 428/404; 516/99, 107
See application file for complete search history.

(56) References Cited

U.S. PATENT DOCUMENTS

| 4,063,856 A | 12/1977 | Dziedzic |
| 4,574,003 A * | 3/1986 | Gerk ........................... 51/309 |
| 4,797,358 A | 1/1989 | Motai et al. |
| 5,314,814 A * | 5/1994 | Harder et al. ............... 435/177 |
| 5,500,162 A | 3/1996 | Theisen et al. |
| 5,725,888 A * | 3/1998 | Scott et al. ..................... 425/6 |
| 5,800,799 A * | 9/1998 | Pinnavaia et al. ........... 423/702 |
| 6,607,705 B2 * | 8/2003 | Pinnavaia et al. ........ 423/328.2 |

FOREIGN PATENT DOCUMENTS

| FR | 2 785 292 | 5/2000 |
| WO | WO 00 25908 | 5/2000 |

OTHER PUBLICATIONS

Search Report issued in International Application No. PCT/FR03/02285, Jan. 5, 2004.

* cited by examiner

*Primary Examiner*—H. (Holly) T Le
(74) *Attorney, Agent, or Firm*—Buchanan Ingersoll & Rooney PC

(57) ABSTRACT

A process for the preparation of beads having a crosslinked inorganic matrix with a size controlled in the millimeter range, which comprises pouring a suspension comprising a precursor of the inorganic matrix and an alginate drop wise into a solution of a polyvalent cation salt with a pH of less than 3, to obtain a reaction medium, in which the alginate gels, and crosslinking the precursor of the inorganic matrix by a sol-gel process.

29 Claims, No Drawings

METHOD FOR PREPARING BEADS CONTAINING A CROSSLINK MINERAL/INORGANIC MATRIX

BACKGROUND OF THE INVENTION

1. Field of the Invention

The present invention relates to a process for the preparation of beads comprising a solid crosslinked inorganic matrix and to the beads obtained.

2. Description of the Related Art

Materials composed of silica particles are used in many fields, for example in the medical field or in the cosmetics industry. When the particles have sizes of the order of a micron, they constitute pulverulent materials which are difficult to handle. Particles of the order of a millimeter do not exhibit these disadvantages and various processes for their manufacture have been developed.

One of these processes consists in preparing a suspension comprising a preprepared oxide powder and an organic binder, in forming (for example by extrusion), in then consolidating by a heat treatment and in optionally depositing an active phase in the pores. Such a process involves specific equipment in order to provide for the forming and the geometry of the particles thus formed. Another process consists in preparing an aqueous suspension comprising an oxide powder and a binder and in then adding this suspension to an oil in order to produce a microemulsion of aqueous droplets which comprise an inorganic phase which crosslinks. However, by this process, only beads with a size of the order of a micron, of between 0.1 and 100 microns, can be obtained.

U.S. Pat. No. 4,063,856 discloses a process for the production of beads of an inorganic material which consists in dissolving in water an organic binder, for example an alginate, capable of gelling in the presence of a divalent or trivalent cation salt (for example a calcium salt), in suspending in said solution the precursors of the inorganic material forming the beads and in then introducing this suspension dropwise into a solution of said divalent or trivalent salt. In addition, U.S. Pat. No. 4,797,358 discloses a process for the preparation of silica grains comprising a microorganism or an enzyme. The process consists in preparing an aqueous mixture comprising the microorganism or the enzyme, an alginate and a silica salt and in then adding this mixture to an aqueous solution of a polyvalent cation salt (calcium chloride, aluminum chloride, calcium acetate, aluminum sulfate) in order to obtain gelled grains. The beads thus obtained are soft beads. In the process of these two documents, the silica added constitutes a simple inorganic filler dispersed within the gelled alginate matrix and does not in any way form a crosslinked solid matrix.

The aim of the present invention is to provide a process for the preparation of beads having a crosslinked inorganic matrix with a size controlled in the millimeter range, and also the beads obtained.

SUMMARY OF THE INVENTION

The process according to the present invention for the production of beads comprising a crosslinked inorganic matrix is characterized in that it consists:

in preparing gelled beads by pouring a suspension comprising a precursor of the inorganic matrix and an alginate dropwise into a solution of a polyvalent cation salt, the pH of which is less than 3, preferably less than 2, and in crosslinking the precursor of the inorganic matrix by a sol-gel process.

The term "crosslinked inorganic matrix" is understood to mean a matrix in which the constituent components (molecules or particles) are connected by a three-dimensional network. The term "polyvalent cation" is understood to mean a cation having a charge at least equal to 2.

DETAILED DESCRIPTION OF THE PREFERRED EMBODIMENTS

The alginate used to form soft beads can be an alkali metal alginate. Sodium alginate is particularly preferred. The combined actions of the polyvalent cation (which exchanges with the alkali metal ions of the alginate) and of the acidity of the medium contribute to gelling this alginate and to congealing the drops as "soft" beads. The time for maintaining beads in this solution can vary between 1 hour and 24 hours.

The precursor of the inorganic matrix is an inorganic compound capable of crosslinking by a sol-gel process chosen from inorganic compounds which have hydroxyl groups bonded to a metal M when they are in solution. M can be Si, Al, Ti or Zr. Si and Al are particularly preferred. These compounds can be chosen from compounds capable of gelling according to the polymerization of molecular entities (PME) mechanism and from compounds capable of gelling according to the destabilization of colloidal solutions (DCS) mechanism. These mechanisms are described in particular by C. J. Brinker & G. W. Scherrer ["Sol-Gel Science, The Physics and Chemistry of Sol-Gel Processing", Eds, 1990, Academic Press Inc., Harcourt Brace Jovanovich Publishers, ISBN 0-12-134970-5], or by M. Henry, J. P. Jolivet & J. Livage ["De la solution à l'oxyde" [From the solution to the oxide], InterEditions/CNRS Editions Eds, 1995 Paris, ISBN 2-271-05252-1].

Mention may be made, among compounds of the PME type, of alkali metal silicates (in particular sodium silicate). Mention may be made, among compounds of the DCS type, of alumina of boehmite type and of colloidal silica.

A compound of the PME type based on silica can be crosslinked by a fluoride, in particular an alkali metal fluoride. An aqueous sodium fluoride solution, the fluoride content of which is between 0.001M and 1M, is particularly appropriate. In this case, the gelling of the alginate and the crosslinking of the inorganic matrix are carried out in two successive stages. It is desirable to leave the reaction medium, comprising the beads formed by the gelled alginate, standing at ambient temperature for a time of between 1 and 24 hours, before subjecting them to the action of the fluoride. During the stage of crosslinking the inorganic precursor, the beads are kept suspended in the reaction medium comprising the fluoride with gentle stirring, until the silica has completely crosslinked. A time of between 6 and 72 hours is generally appropriate.

For a compound of the DCS type, the pH of less than 3 of the reaction medium during the gelling of the alginate is sufficient to bring about crosslinking. The gelling of the alginate and the crosslinking of the inorganic matrix are consequently carried out simultaneously. A pH of less than 2 is particularly preferred. It is desirable to leave the reaction medium, comprising the beads formed by the gelled alginate and the crosslinked inorganic matrix, standing at ambient temperature for a time of between 1 and 24 hours.

The process is carried out at a temperature between 10° C. and 60° C. It is particularly advantageous to operate at ambient temperature.

The polyvalent cation salt used for the gelling of the alginate can be chosen from salts for which the anion is a halide, a nitrate or a sulfate and for which the cation is an alkaline-earth metal, transition metal or noble metal cation. Mention may be made, by way of examples, of nickel, iron, cobalt, aluminum, calcium, tin, zinc or platinum salts. When a precursor of the PME type (for example a silicate) is used as precursor of the inorganic matrix, the cation of the salt used as gelling agent for the alginate must be other than calcium. This is because, during the crosslinking of the silicate by the fluoride, the calcium would be extracted from the alginate gel by the fluoride ions to form $CaF_2$, which is insoluble in an aqueous medium, and the gel structure of the alginate would be destroyed.

The material obtained after crosslinking the inorganic matrix is formed of beads suspended in an aqueous medium. The beads formed have a diameter of 0.5 mm to a few mm, generally of 0.5 mm to 6 mm. They are composed of a hydrated matrix of gelled alginate, of a crosslinked inorganic matrix resulting from the gelling of the inorganic precursor by a sol-gel process, and of a hydroxide of the polyvalent cation of the salt used as gelling agent. At this stage, the product can be stored as is for several days. The diameter of the beads depends in particular on the size of the drops of solution poured into the polyvalent cation salt solution. This diameter can be adjusted by choosing the appropriate equipment for the formation of the drops.

The composition and the properties of the beads can be modified by the choice of the polyvalent salt used as gelling agent for the alginate. For example, the use of an iron salt as gelling agent for the alginate gives a red-brown coloring to the beads, whereas the use of an aluminum salt does not give a coloring. Modifications can also be obtained by addition of various compounds to the reaction medium before the gelling of the alginate, said compounds being chosen from those which do not have an effect on the gelling of the alginate. When the beads are intended to be used in cosmetic compositions, pigments or organic dyes for cosmetic use, kaolin powder or another clay in powder form, or a coloring agent can be added to the reaction medium, before the gelling of the alginate. When it is desired to obtain porous beads, a pore-forming agent, for example a surface-active agent, can be added to the reaction medium before the gelling of the alginate.

The beads obtained after crosslinking the inorganic matrix can subsequently be used as is. They can also be extracted from the liquid medium by filtration and be subjected to various other treatments. Generally, the beads are washed with water or with a basic aqueous solution at a pH<8 in order to remove the residual acidity, this washing not destroying their structure if the pH remains below 8.

In a specific embodiment, the beads separated by filtration are subjected to drying in the air, optionally after having been washed with acetone or with alcohol. Dry beads formed of a material composed of an alginate network, an inorganic matrix and a hydroxide of the cation originating from the agent for gelling the alginate are thus obtained. However, such a treatment results in a decrease in the size of the beads in a ratio of approximately 5/1.

In another embodiment, the process comprises a stage during which the beads separated from the reaction medium by filtration are dried by lyophilization. The material constituting the beads exhibits, in this case, a composition analogous to that which is obtained by drying in the air. However, drying by lyophilization results in a markedly smaller decrease in the size of the beads.

In a third embodiment, the beads extracted from the reaction medium by filtration are washed with acetone or with alcohol and are then placed in a solution comprising an alkoxide of a metal M' diluted in an anhydrous organic solvent compatible with the alkoxide. The metal M' can be any metal which can give an alkoxide of the form M' $(OR)_n$, R being an alkyl group and n being the valency of M'. Mention may be made, by way of examples, of titanium, zirconium, aluminum, niobium and tantalum. The organic solvent is preferably the alcohol which corresponds to the alkoxy group of the metal alkoxide (for example, butanol for titanium tert-butoxide, propanol for titanium isopropoxide). The alkoxide hydrolyzes only on contact with the bead as the latter comprises residual water. Beads formed of a core having a composition analogous to that of the beads obtained by simple drying and of a surface layer of oxide or of hydroxide of the metal M are thus obtained.

In a fourth embodiment, the beads separated from the reaction medium by filtration are subjected to calcination at a temperature of between 400° C. and 800° C. Porous inorganic beads devoid of organic compounds, composed of a crosslinked inorganic matrix and the hydroxide of the cation of the salt which was used as crosslinking agent for the alginate, are thus obtained. This embodiment is particularly appropriate when pore-forming organic agents were introduced into the reaction medium before the gelling of the alginate.

The process provided makes it possible to obtain graded beads at a high rate. The size of the beads depends only on the size of the initial drop poured into the polyvalent salt solution. Another advantage lies in the fact that the preparation stages proper for the beads are carried out in an aqueous medium, which reduces the risks of pollution related to the use of organic solvents. In addition, the beads obtained are biocompatible and can be prepared with components in accordance with regulations relating to foodstuffs and cosmetics.

The present invention is illustrated in more detail by the following examples, to which, however, it is not limited.

EXAMPLE 1

1 g of sodium alginate was dissolved in 50 ml of distilled water, and 6 g of sodium silicate $Na_2Si_3O_7$ were added dropwise to this solution with magnetic stirring. The aqueous solution obtained, referred to as "mother solution", is a viscous yellow solution which exhibits a pH in the region of 9.

An $FeCl_3$ solution (0.5M) was prepared by adding 4 g of $FeCl_3$ to 50 ml of distilled water, the pH of which was adjusted to a value between 0.6 and 0.8 by addition of an appropriate amount of hydrochloric acid. The mother solution was poured dropwise into said $FeCl_3$ solution using a syringe comprising a needle having an outlet diameter of 0.6 mm. On contact with the $FeCl_3$ solution, the drops of mother solution gelled and beads were formed. The reaction medium was left stirring using a magnetic stirrer for 14 h.

The beads were subsequently separated from the reaction medium by filtration, were rinsed with water and were poured into a 0.1M NaF solution prepared beforehand by addition of 0.2 g of NaF to 50 ml of distilled water. As the $F^-$ ion is a catalyst for the condensation of silica, it makes possible rapid crosslinking of the sodium silicate. The reaction medium was kept stirred for 14 h and then the beads were separated by filtration.

A fraction of the beads thus recovered was retained in distilled water for the purpose of subsequent use.

A second fraction of the beads was dehydrated by maintaining in acetone for 2 hours and then drying in the air.

A third fraction of the beads was dehydrated by maintaining in acetone for 2 hours and then drying by lyophilization.

All the beads finally obtained exhibit a brown-red coloring resulting from the presence of the iron salt.

EXAMPLE 2

The procedure of example 1 was repeated, the 0.5M $FeCl_3$ solution being replaced by a 0.5M $AlCl_3$ solution, everything otherwise being equal. The beads obtained have a white coloring.

EXAMPLE 3

1 g of sodium alginate was dissolved in 50 ml of distilled water, and an aqueous suspension comprising 1.5 g of boehmite in 25 ml of distilled water was added dropwise to this solution with magnetic stirring. The aqueous solution obtained, referred to as "mother solution", is a viscous yellow solution which exhibits a pH in the region of 9.

An $FeCl_3$ solution (0.5M) was prepared by adding 4 g of $FeCl_3$ to 50 ml of distilled water, the pH of which was adjusted to a value between 0.6 and 0.8 by addition of an appropriate amount of hydrochloric acid. The mother solution was poured dropwise into said $FeCl_3$ solution using a syringe comprising a needle having an outlet diameter of 0.6 mm. On contact with the $FeCl_3$ solution, the drops of mother solution gelled and beads were formed. The reaction medium was left stirring using a magnetic stirrer for 14 h, the pH being maintained at 1 by addition of a hydrochloric acid solution (M).

The beads were subsequently separated from the reaction medium by filtration.

A fraction of the beads thus recovered was retained in distilled water for the purpose of subsequent use.

A second fraction of the beads was dehydrated by maintaining in acetone for 2 hours and then drying in the air.

A third fraction of the beads was dehydrated by maintaining in acetone for 2 hours and then drying by lyophilization.

All the beads finally obtained exhibit a brown-red coloring resulting from the presence of the iron salt.

EXAMPLE 4

1 g of sodium alginate was dissolved in 50 ml of distilled water, and 6 g of sodium silicate $Na_2Si_3O_7$ were added dropwise to this solution with magnetic stirring. The aqueous solution obtained, referred to as "mother solution", is a viscous yellow solution which exhibits a pH in the region of 9. 0.1 g of an inorganic pigment with a pearlescent effect based on mica and on titanium, in accordance with legislation relating to cosmetic products, was added to this mother solution.

An $AlCl_3$ solution (0.5M) was prepared by adding 3.3 g of $AlCl_3$ to 50 ml of distilled water, the pH of which was adjusted to a value between 0.6 and 0.8 by addition of an appropriate amount of hydrochloric acid. The mother solution comprising the pearlescent agent was poured dropwise into said $AlCl_3$ solution using a syringe comprising a needle having an outlet diameter of 0.6 mm. On contact with the $AlCl_3$ solution, the drops of mother solution gelled and beads were formed. The reaction medium was left stirring using a magnetic stirrer for 14 h.

The beads were subsequently separated from the reaction medium by filtration, were rinsed with water and were stored in distilled water.

EXAMPLE 5

The procedure of example 4 was repeated but while adding to the mother solution, in addition to the pearlescent agent, an inorganic filler composed of 1.3 g of kaolin.

The beads obtained at the end of the stage of gelling the alginate exhibit a milky-pink coloring. The presence of the kaolin limits the shrinkage when the beads are dried in the air.

EXAMPLE 6

1 g of sodium alginate was dissolved in 50 ml of distilled water, and an aqueous suspension comprising 1.5 g of boehmite in 25 ml of distilled water was added dropwise to this solution with magnetic stirring in order to prepare a mother suspension.

A colored aqueous solution was prepared separately by adding 3.3 g of $AlCl_3$ and 0.2 g of an organic orange pigment in accordance with legislation with regard to products for food and cosmetic use to 50 ml of distilled water, the pH being adjusted to a value of between 0.6 and 0.8. The mother suspension was poured dropwise into said $AlCl_3$ solution using a syringe comprising a needle having an outlet diameter of 0.6 mm. On contact with the $AlCl_3$ solution, the drops of mother suspension gelled and orange-colored beads in which the boehmite is crosslinked were formed.

The beads were separated by filtration, rinsed several times with water, to remove the acid residues, and then stored in distilled water.

EXAMPLE 7

0.74 g of a surface-active agent $CH_3(CH_2)_{14}(CH_2CH_2O)_{12}H$ [sold under the name Tergitol 15S12 by Union Carbide] was dissolved in 49 ml of deionized water. 2 ml of N hydrochloric acid were added and the solution was maintained at a temperature of less than 2° C. 5.9 g of sodium silicate ($Na_2Si_3O_7$) were subsequently added dropwise, which brought the pH to 9. At the same time, 1 g of sodium alginate was dissolved in 50 ml of deionized water and then this solution was added to the alginate solution to obtain a solution A.

A 0.1M nickel(II) chloride solution was also prepared by adding 5 ml of an M aqueous nickel(II) chloride solution to 50 ml of deionized water.

The solution A was subsequently poured dropwise into the 0.1M nickel chloride solution and the formation of beads by gelling of the alginate on contact with the nickel(II) chloride was observed. The reaction medium comprising the gelled beads was subsequently maintained at ambient temperature with magnetic stirring for 12 h.

The beads obtained were subsequently filtered off and rinsed with water and then they were poured into a 0.1M aqueous NaF solution obtained by dissolving 0.4 g of NaF in 100 ml of deionized water. The suspension was maintained at ambient temperature with magnetic stirring for 24 hours. Subsequently, the beads were recovered by filtration and rinsed with water, and were stored in water.

The beads obtained can be used as solid catalyst support.

What is claimed is:

1. A process for the preparation of beads having a crosslinked inorganic matrix with a size controlled in the millimeter range, which comprises, pouring a suspension comprising a precursor of the inorganic matrix and an alginate dropwise into a solution of a polyvalent cation salt with a pH of less than 3, to obtain a reaction medium, in which the alginate gels, and crosslinking the precursor of the inorganic matrix by a sol-gel process.

2. The process as claimed in claim 1, wherein the pH is less than 2.

3. The process as claimed in claim 1, wherein the alginate is an alkali metal alginate.

4. The process as claimed in claim 1, wherein the beads are maintained in the reaction medium for a time of 1 hour to 24 hours for the gelling of the alginate.

5. The process as claimed in claim 1, wherein the precursor of the inorganic matrix is an inorganic compound capable of crosslinking by a sol-gel process chosen from inorganic compounds which have hydroxyl groups bonded to a metal when they are in solution.

6. The process as claimed in claim 5, wherein the precursor of the inorganic matrix is a compound capable of crosslinking according to the polymerization of molecular entities (PME) mechanism.

7. The process as claimed in claim 6, wherein the precursor of the inorganic matrix is an alkali metal silicate.

8. The process as claimed in claim 6, wherein the precursor of the inorganic matrix is crosslinked by an alkali metal fluoride during a stage following the gelling of the alginate, the polyvalent cation salt used for the gelling of the alginate having a cation other than calcium.

9. The process as claimed in claim 8, wherein the crosslinking of the inorganic matrix is carried out while stirring the reaction mixture for a time of between 6 and 72 hours.

10. The process as claimed in claim 5, wherein the precursor of the inorganic matrix is a compound capable of crosslinking according to the destabilization of colloidal solutions (DCS) mechanism.

11. The process as claimed in claim 10, wherein the precursor of the inorganic matrix is an alumina of boehmite type or a colloidal silica.

12. The process as claimed in claim 10, wherein the precursor of the inorganic matrix is crosslinked under the effect of the pH of the reaction medium during the gelling of the alginate.

13. The process as claimed in claim 12, wherein the reaction medium is maintained at ambient temperature for a time of between 1 and 24 hours.

14. The process as claimed in claim 1, wherein it is carried out at a temperature between 10° C. and 60° C.

15. The process as claimed in claim 1, wherein the polyvalent cation salt used for the gelling of the alginate is chosen from salts for which the anion is a halide, a nitrate or a sulfate and for which the cation is an alkaline-earth metal, transition metal or noble metal cation.

16. The process as claimed in claim 1, wherein at least one additive chosen from pigments, kaolin powder, clays, coloring agents and pore-forming agents is added to the suspension comprising the precursor of the inorganic matrix and the alginate.

17. The process as claimed in claim 16, wherein the at least one additive comprises an organic coloring agent for cosmetic use.

18. The process as claimed in claim 1, wherein the beads obtained after crosslinking the inorganic matrix are extracted from the reaction medium by filtration.

19. The process as claimed in claim 18, wherein the beads separated by filtration are washed with water or with a basic aqueous solution at a pH<8.

20. The process as claimed in claim 18, wherein the beads separated by filtration are subjected to drying in the air, optionally after having been washed with acetone or with alcohol.

21. A bead obtained by a process as claimed in claim 20, wherein the bead is comprised of an alginate network, a crosslinked inorganic matrix and a hydroxide originating from the polyvalent cation salt with a pH of less than 3.

22. The bead as claimed in claim 21, wherein it additionally comprises at least one compound chosen from pigments, kaolin powder, clays and coloring agents.

23. The bead as claimed in claim 22, wherein the at least one compound comprises an organic coloring agent for cosmetic use.

24. The process as claimed in claim 18, wherein the beads separated from the reaction medium by filtration are dried by lyophilization.

25. The process as claimed in claim 18, wherein the beads extracted from the reaction medium by filtration are washed with acetone or with alcohol and are then placed in a solution comprising an alkoxide of a metal diluted in an anhydrous organic solvent.

26. A bead obtained by a process as claimed in claim 25, wherein the bead is formed of a core comprised of an alginate network, a crosslinked inorganic matrix and a hydroxide of the cation originating from the agent for gelling the alginate and of a surface layer of metal oxide or hydroxide.

27. The process as claimed in claim 18, wherein the beads separated from the reaction medium by filtration are subjected to calcination at a temperature of between 400° C. and 800° C.

28. A bead obtained by a process as claimed in claim 27, wherein the bead is comprised of a crosslinked inorganic matrix and a hydroxide of the cation originating from the agent for gelling the alginate, and is porous and is devoid of organic compounds.

29. A material formed of beads suspended in an aqueous medium wherein the beads are obtained by a process as claimed in claim 1, have a diameter of 0.5 mm to 6 mm and are comprised of a hydrated matrix of gelled alginate, a crosslinked inorganic matrix and a hydroxide of the polyvalent cation of the salt used as gelling agent.

* * * * *